United States Patent
Horton

[19]

[11] Patent Number: 6,065,502
[45] Date of Patent: May 23, 2000

[54] METHOD AND APPARATUS FOR WRINKLE-FREE HYDROFORMING OF ANGLED TUBULAR PARTS

[75] Inventor: Frank A. Horton, Rochester Hills, Mich.

[73] Assignee: Cosma International Inc., Aurora, Canada

[21] Appl. No.: 09/299,595

[22] Filed: Apr. 27, 1999

Related U.S. Application Data

[62] Division of application No. 09/167,674, Oct. 7, 1998.
[60] Provisional application No. 60/061,238, Oct. 7, 1997.

[51] Int. Cl.[7] .................................................... F16L 9/00
[52] U.S. Cl. ........................ 138/177; 138/177; 138/109; 72/61
[58] Field of Search .................................. 138/177, 178, 138/109; 72/58, 60–62

[56] References Cited

U.S. PATENT DOCUMENTS

| | | | |
|---|---|---|---|
| 2,203,868 | 6/1940 | Gray et al. ............................ | 72/62 |
| 3,719,209 | 3/1973 | Rush et al. .......................... | 138/177 |
| 4,283,447 | 8/1981 | Flynn .................................. | 138/177 X |
| 4,317,348 | 3/1982 | Halene et al. ........................ | 72/58 |
| 4,636,346 | 1/1987 | Gold et al. .......................... | 138/177 X |
| 4,662,404 | 5/1987 | LeVeen et al. ...................... | 138/177 X |
| 4,744,695 | 5/1988 | Lindsey et al. ...................... | 138/177 X |
| 4,761,982 | 8/1988 | Snyder ................................ | 72/58 |
| 4,998,754 | 3/1991 | Matsumoto et al. ................. | 138/177 X |
| 5,269,650 | 12/1993 | Benson ............................... | 138/177 X |
| 5,481,892 | 1/1996 | Roper et al. ........................ | 72/61 |
| 5,735,156 | 4/1998 | Yoshitomi et al. .................. | 72/57 |
| 5,845,382 | 12/1998 | Schultz et al. ...................... | 29/421.1 |
| 5,862,877 | 1/1999 | Horton et al. ...................... | 281/781 |

FOREIGN PATENT DOCUMENTS

| | | |
|---|---|---|
| 0 610 783 A1 | 8/1994 | European Pat. Off. . |
| 2 535 987 | 11/1982 | France . |
| 4322711A1 | 1/1995 | Germany . |

OTHER PUBLICATIONS

International Search Report re: PCT/CA98/00938 dated Feb. 25, 1999.

*Primary Examiner*—Patrick Brinson
*Attorney, Agent, or Firm*—Pillsbury Madison & Sutro LLP

[57] ABSTRACT

A vehicle part suitable to form a part of a rigid vehicle assembly, such as a vehicle frame assembly or the like. The vehicle part is formed from a cylindrical blank having a predetermined wall thickness and a predetermined peripheral dimension. The cylindrical blank is bent and hydroformed to provide a tubular wall having a central bend therein of at least approximately 30° and opposite angularly related end portions. The central bend has a peripheral dimension in excess of approximately 10% of the predetermined peripheral dimension of the cylindrical blank. The central bend includes a concave portion free of wrinkles and a convex portion having a wall thickness within plus or minus 10% of the predetermined wall thickness of the cylindrical blank.

7 Claims, 6 Drawing Sheets

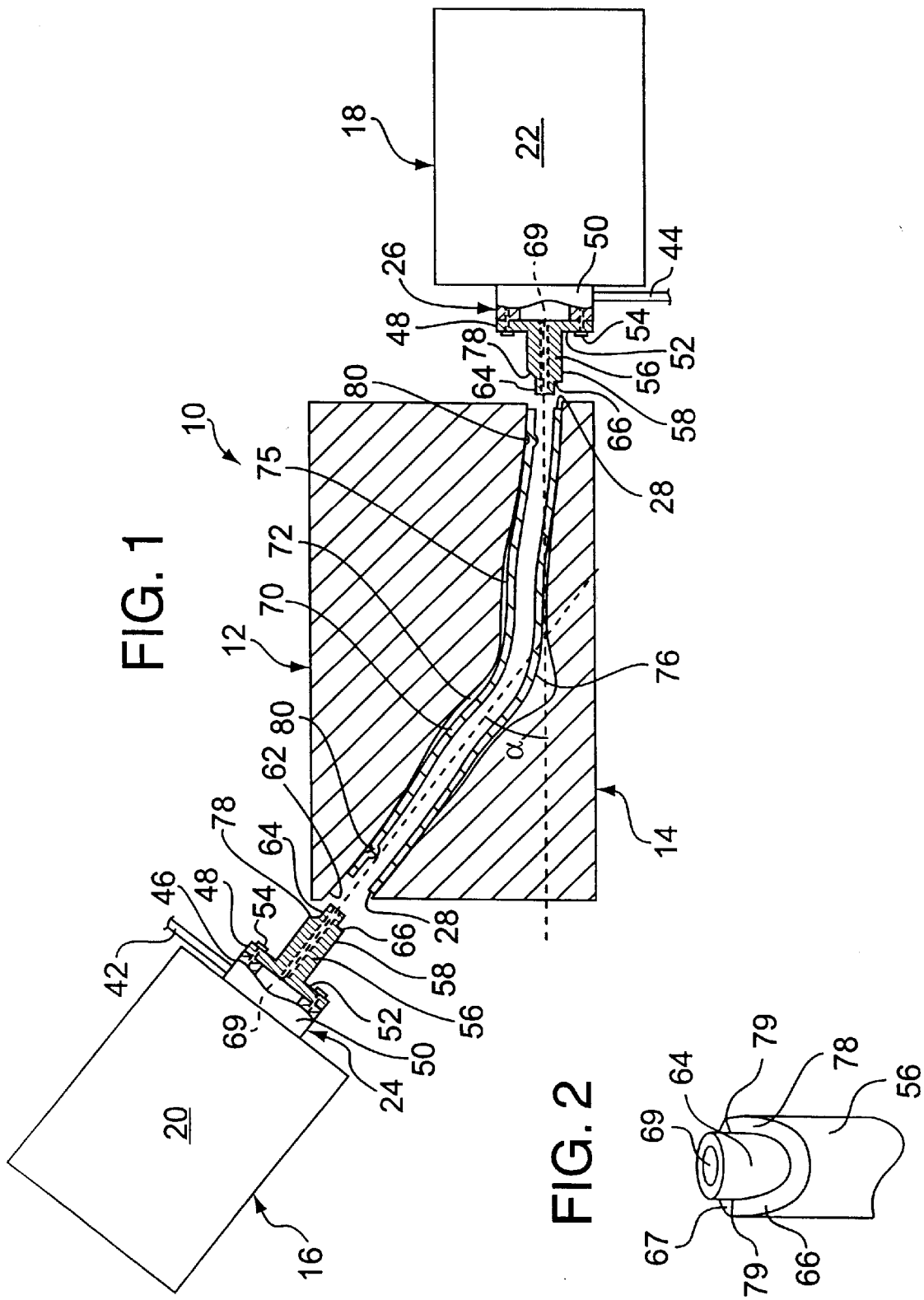

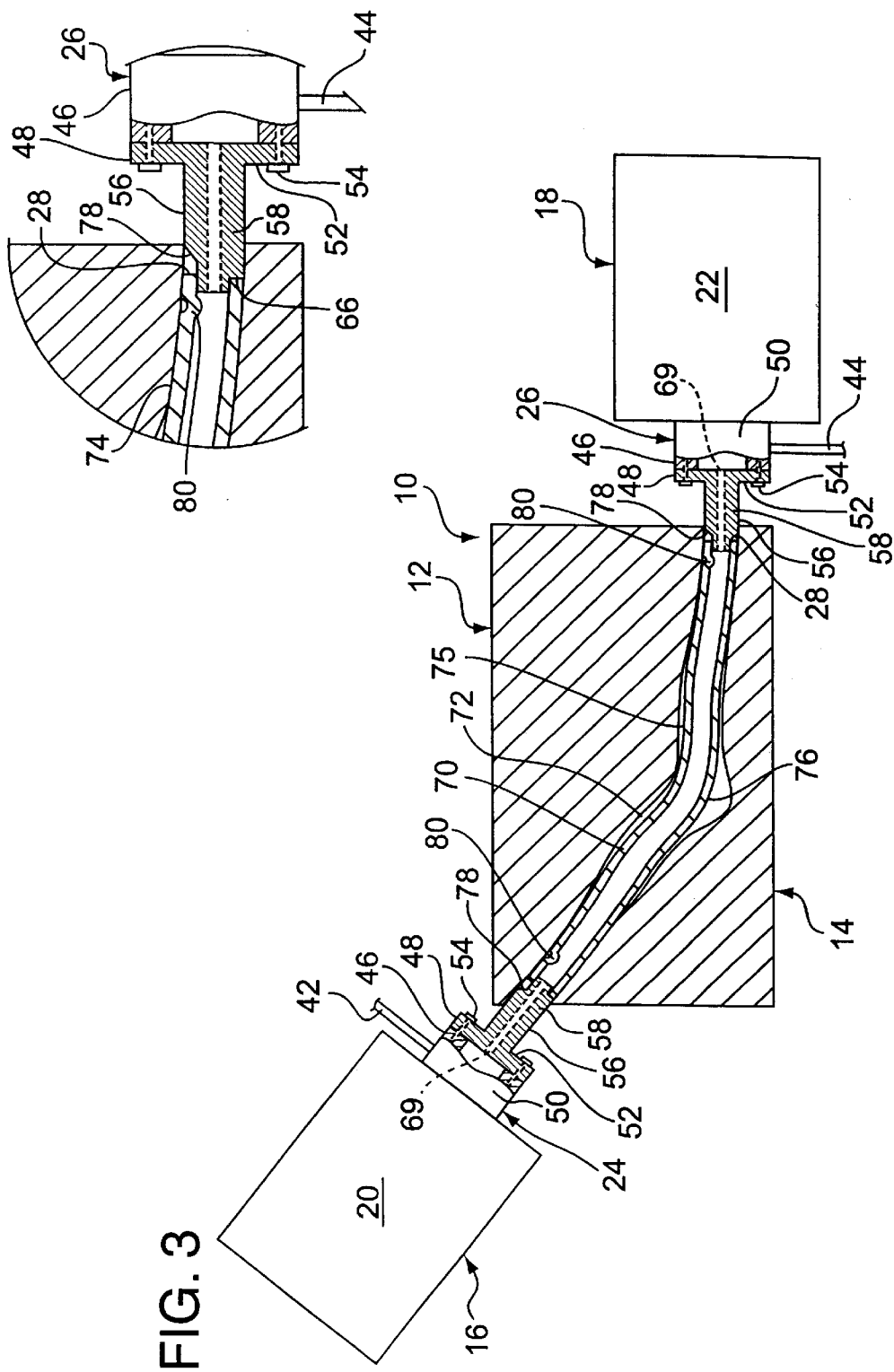

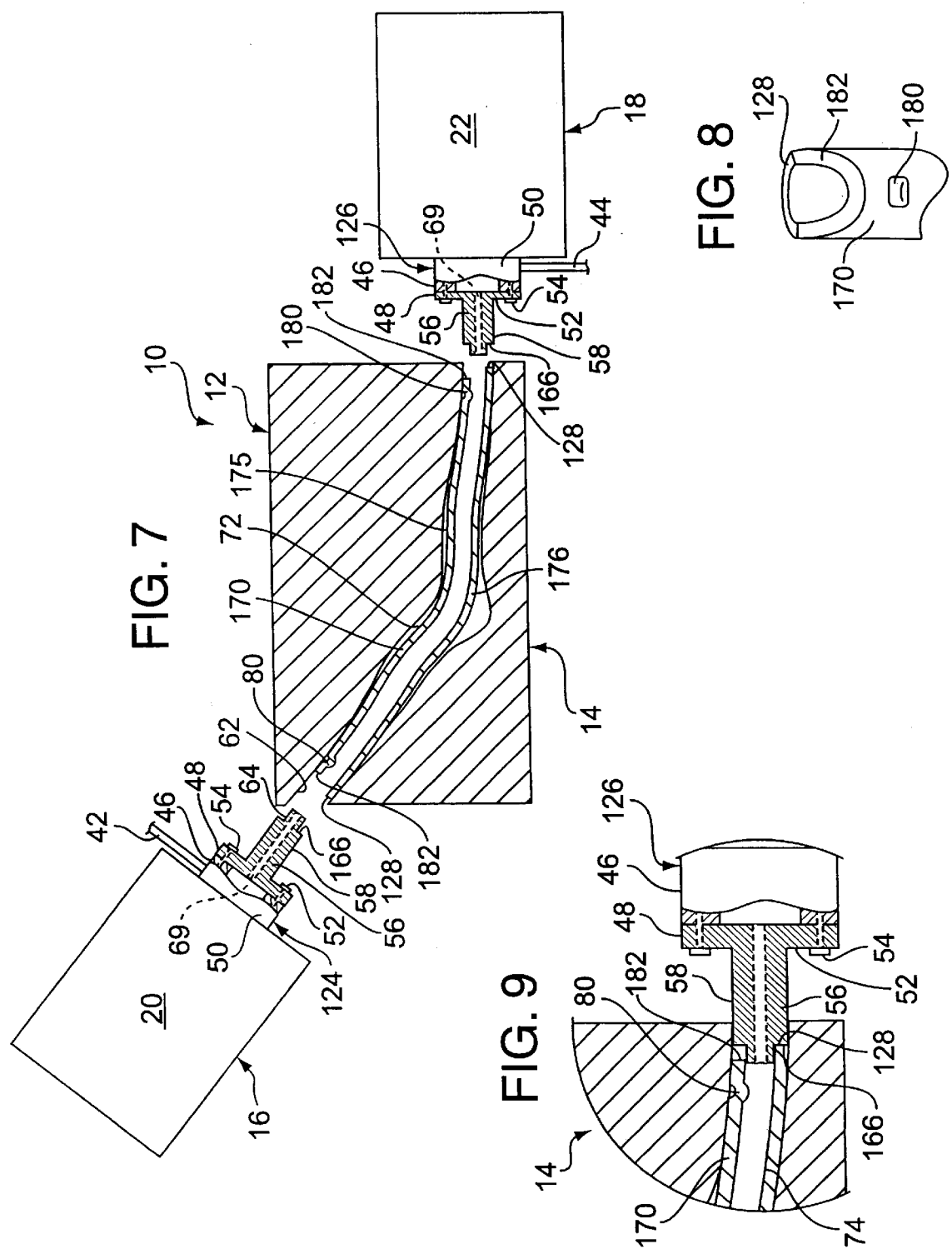

METHOD AND APPARATUS FOR WRINKLE-FREE HYDROFORMING OF ANGLED TUBULAR PARTS

This is a division of application Ser. No. 09/167,674, filed Oct. 7, 1998, and also claims the benefit of Provisional Application No. 60/061,238, filed Oct. 7, 1997.

The present invention relates to hydroforming, and more particularly to a method and apparatus used to make wrinkle-free hydroformed angled tubular parts.

The angled tubular parts herein contemplated are vehicle parts and more specifically parts of vehicle assemblies, such as vehicle frames and cradles. The part may be a frame member, a cross member, a side member, an A pillar part or the like.

Heretofore, angled parts of the type herein contemplated if made in tubular form with an angle greater than 30° required the welding of a reinforcing bracket to the convex portion of the bend in order to strengthen the reduced thickness of the wall at the convex portion of the bend. The welding of the reinforcing bracket to the tubular bent part having a reduced thickness at the convex portion sufficient to require the reinforcing bracket added material cost and unwanted weight to the finished part. There is always a need to make vehicle parts lighter and in a more cost effective manner by improved manufacturing methods and apparatus.

BRIEF DESCRIPTION OF THE INVENTION

An object of the present invention is to fulfill the need expressed above. In accordance with the principles of the present invention, this objective is obtained by providing a method of hydroforming an angled tubular part comprising disposing an angled metal tubular blank within a generally correspondingly angled die cavity. The tubular blank having an exterior surface wherein at an angled portion of the tubular blank the exterior surface has a concave surface portion and a convex surface portion on generally opposite sides of the tubular blank. The opposite ends of the tubular blank are sealed, providing high pressure fluid to an interior of the tubular blank, expanding the blank into conformity with surfaces defining the die cavity as a result thereof. Applying force to at least one end of the tubular blank so as to create longitudinal flow of metal material within the tubular blank to maintain a wall thickness of the blank within a predetermined range, wherein a greater amount of force is applied to a portion of the tubular blank which is longitudinally aligned with the convex surface portion of the tubular blank in comparison with the amount of force applied for a portion of the tubular blank so as to create a greater amount of flow of metal material toward portions of the tubular blank adjacent the convex surface portion in comparison with portions of the tubular blank adjacent the concave surface portion, so as to inhibit wrinkle formation at the portions of the tubular blank adjacent the concave portion.

In accordance with the principles of the present invention, the above recited object is also obtained by providing a hydroforming die assembly for forming an angled tubular part comprising a die structure having die parts, which include die surfaces cooperable to define an angled die cavity into which a bent tubular metal blank is to be placed. The bent tubular metal blank has an exterior surface which includes a concave surface portion and a convex surface portion on opposite sides thereof. The first and second ram assemblies have respective first and second associated tube-end engaging structures disposed at opposite ends of the die cavity. The tube-end engaging surfaces are constructed and arranged to be inserted into the opposite ends of the die cavity. The tube-end engaging structures have tube-end engaging surfaces for engaging opposite ends of the tubular metal blank placed in the die cavity. The tube-end engaging structures further comprise ports constructed and arranged to provide hydroforming fluid to an interior of the tubular metal blank. The ram assemblies further comprise a fluid pressurizing system constructed and arranged to increase pressure of the hydroforming fluid provided to the interior of the tubular metal blank sufficient to expand the tubular metal blank into conformity with the die surfaces defining the die cavity. At least one of the tube-engaging structures being movable by the associated ram assembly into forced engagement with one end of the opposite ends of the tubular metal blank so as to longitudinally compress the tubular metal blank between the tube-end engaging structures and thereby create longitudinal flow of metal material during expansion of the tubular metal blank in order to maintain a wall thickness of the tubular metal blank with a desired range. At least one movable tube-end engaging structure has the tube-end engaging surface thereof constructed and arranged to apply a greater amount of force to a portion of one end of the tubular metal blank which is longitudinally aligned with the convex surface portion of the tubular metal blank in comparison with an amount of force applied to a portion of one end of the tubular metal blank which is longitudinally aligned with the convex surface portion of the blank so as to create a greater amount of longitudinal flow of metal towards the convex surface portion of the tubular metal blank in comparison with the amount of longitudinal flow of metal towards the concave surface portion of the tubular metal.

In accordance with the principles of the present invention, the above recited object is also obtained by providing a vehicle part suitable to form a part of a rigid vehicle assembly, such as a vehicle frame assembly or the like. The vehicle part is formed from a cylindrical blank having a predetermined wall thickness and a predetermined peripheral dimension. The cylindrical blank is bent and hydroformed to provide a tubular wall having a central bend therein of at least approximately 30° and opposite angularly related end portions. The central bend has a peripheral dimension in excess of approximately 10% of the predetermined peripheral dimension of the cylindrical blank. The central bend includes a concave portion free of wrinkles and a convex portion having a wall thickness within plus of minus 10% of the predetermined wall thickness of the cylindrical blank.

BRIEF DESCRIPTION OF THE DRAWINGS

FIG. 1 is a schematic view of a hydroforming system, partly in section, and showing a bent tube blank disposed in a lower die structure in accordance with the principles of the present invention;

FIG. 2 is a perspective view of a tube-engaging portion of a hydraulic ram in accordance with the present invention;

FIG. 3 is a view similar to that shown in FIG. 1, but showing the hydraulic system rams sealingly inserted into the opposite ends of the tube blank;

FIG. 4 is an enlarged sectional view of the interface between one end of the tubular blank and the associated hydraulic ram;

FIG. 7 shows hydroforming system, partly in section, in accordance with a second embodiment of the present invention;

FIG. 8 is a perspective view showing the notched end of a tube blank in accordance with the second embodiment of the present invention;

FIG. 9 is an enlarged sectional view showing the interface between one end of the tubular blank and the associated hydraulic ram in accordance with the second embodiment of the present invention.

DETAILED DESCRIPTION OF THE INVENTION

Figure 10:
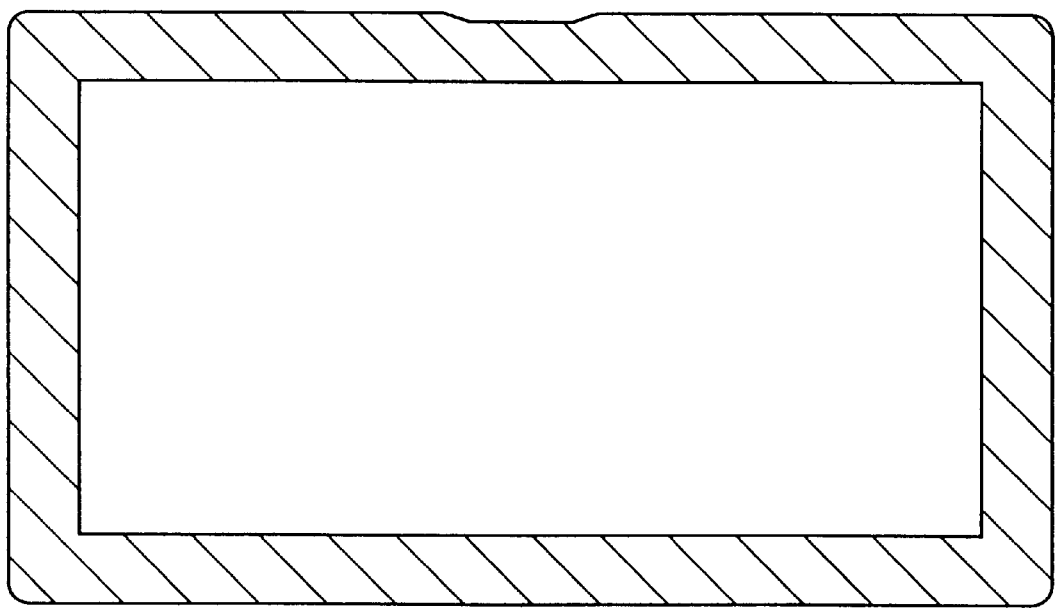
FIG. 10 is a cross-sectional view of a vehicle part manufactured in accordance with the present invention.

Referring more particularly to FIG. 1, there is shown a hydroforming system 10, that includes a hydroforming die structure 12, and a pair of hydraulic ram assemblies 16 and 18. The die structure 12 includes a lower die portion 14, a cross section, as shown in FIG. 10, and of which is depicted schematically in FIG. 1. The die structure 12 is manufactured substantially in accordance with application Ser. No. 60/024,524, filed Aug. 26, 1996, which is hereby incorporated by reference, with the exception of the shape of the die cavity formed thereby.

The hydraulic ram assemblies 16 and 18 are disposed at opposite ends of the die structure 12. The ram assemblies 16 and 18 generally include respective ram housings 20 and 22, and respective outer rams 24 and 26, which project outwardly from the ram housings 20 and 22.

As can be seen in FIG. 3, the outer ram 24 is movable outwardly from the ram housing 20 and into engagement in sealing relation with one end 28 of a tube blank 70 to be hydroformed, which has been placed in the lower die portion 14. Similarly, the outer ram 26, is movable outwardly from the ram housing 22 and is constructed and arranged so as to engage and seal the opposite end 28 of tube 70 (see FIG. 4). The ram assemblies 16 and 18 are provided with fluid pressurizing intensifiers and are hydraulically operable to longitudinally compress a tubular blank during expansion of the tubular blank in accordance with conventional hydroforming systems. It is alternately contemplated that the ram assemblies 16 and 18 may operate in accordance with the teachings of application Ser. No. 60/043,950, filed Apr. 16, 1997, and hereby incorporated by reference. In accordance with the teachings of Ser. No. 60/043,950, the hydroforming system 10 would include a valve arrangement that is used to control fluid flow into the outer ram 24 when the rams 24 and 26 are engaged and sealed with the tube ends 28. The outer ram 24, in turn, directs fluid, preferably water, into the interior of the tube 70.

The outer rams 24 and 26 each comprise a main portion 46, and an end cap 48 fixed to the main portion. More particularly, each main portion 46 is in the form of a robust tubular sleeve portion, extending outwardly from a respective ram housing 20 or 22. Each end cap 48 includes an annular flange portion 52 bolted and sealed by appropriate fasteners 54 to the circular edge at the distal end of the main portion 46. Each end cap 48 further includes an elongated tubular portion 56 integrally formed with the flange portion 52 and extending axially in an outward direction with respect to main portion 46. Each tubular portion 56 is of reduced exterior diameter in comparison with flange portion 52 and has a generally cylindrical exterior surface, which is constructed and arranged to form a peripheral seal with the corresponding cylindrical surface 62 formed at each end of the hydroforming die cavity when the upper and lower die are in a closed position (i.e., when the upper die portion is lowered onto lower die portion 14).

As best seen in FIG. 2, the end cap 48 terminates in a nozzle portion 64, which is integrally formed with and projects outwardly from the tubular portion 56. The nozzle portion 64 is substantially tubular in shape, and is of a reduced outer diameter in comparison with the tubular portion 56. A radially extending annular flange surface 66 is disposed at the transition between the tubular portion 56 and the nozzle portion 64. The flange surface 66 has a partial annular portion 67 constituting a tube engaging surface portion constructed and arranged to engage, in sealing relation, an end 28 of the tube 70 during a hydroforming operation. The flange surface 66 further includes a notched or cut-away surface portion 78 which extends away from the end 28 of the tube when the surface portion 67 is engaged. The partial annular surface portion 67 transitions into the cut-away or notched portion 78 at corners 79.

Each nozzle portion 64 has a cylindrical exterior surface constructed and arranged to be frictionally received within one end of the tube 70 and slidably engage interior cylindrical surface portions at the ends of the tube 70 so that the ends of the tube are sealed during high pressure hydroforming. A longitudinal bore 69, extends through each end cap 48, and is constructed and arranged to communicate high pressure fluid from the outer rams 24 (or at least one of the outer rams), to the inner confines of tube 70.

When the upper die structure is lowered onto the lower die structure 14, an expansion die cavity 72 is formed and is defined by peripheral die cavity surfaces corresponding to the desired final formed shape of the hydroformed tube 70. For most applications, the tube blank 70 will have a circular cross-section and will be hydroformed to have a rectangular cross-section as described in application Ser. No. 60/024, 524. Thus, it can be appreciated that the die cavity 72 transitions from a cylindrical configuration at opposite ends thereof (e.g., at surfaces 62) to a squared configuration cross-section wise at a central portion thereof. It can be seen in FIG. 1 that in this hydroforming application, the desired hydroformed part has somewhat of a bent configuration. In particular, the present invention achieves its greatest benefit when hydroforming parts which are to be provided with a bend of 30° or greater when comparing central longitudinal axes at opposite ends of the tube. For example, in FIG. 1, angle α is greater than 30°. As can be appreciated from FIG. 1, angle α represents not only the angle of deviation or bend of the tube in comparison with a straight tube, it also represents such angling of the die cavity into which the tube is placed. Also in accordance with the invention, the tubular blank 70 which is to be hydroformed, and which is originally manufactured as a straight tube in a standard roll-forming operation, is pre-bent to fit within the arcuate contours of the die cavity 72. This pre-bending operation can be accomplished, for example in a conventional computer numeric controlled ("CNC") assembly.

Also, in accordance with the present invention, the hydroformed part is to be expanded at some portions by preferably at least 10% in comparison with the original diameter of the tubular blank, and more preferably at some portions by at least 20%. In order to accomplish this without undesirably thinning the walls of the hydroformed part, the opposite ends 28 the tube 70 are longitudinally compressed by inward movement of rams 24 and 26 towards one another. This longitudinal compression of the tube 70 during expansion thereof creates longitudinal flow of the metal material forming the tube 70 so that the wall thickness of the hydroformed part remains within about 10% of that of the original blank. It can be appreciated that unless certain measures are taken, an accumulation of flowed metal may occur at the concave portion 75 of the bend (when viewing the exterior surface of the tube), because less material flow is required here in comparison with the convex portion 76 of the bend.

In order to provide for a wrinkle free part relative to the exterior configuration of concave portion 75, the notched portion 78 formed in the annular flange surface 66 of outer rams 24 and 26 is provided. More particularly, referring now to FIGS. 3 and 4, it can be seen that the partial circular portions 67 of annular flange surfaces 66 of outer rams 24 and 26, engage the ends 28 of tube 70. As indicated in the drawings, notched portions 78, are longitudinally aligned with the inner concave portion 75 of tube 70. Because the notched portions 78 angle away from the adjacent portions of tube ends 28 and are not forced against the tube ends 28 when rams 24 and 26 are forced relatively towards one another, less metal flows to the inner concave portion 75 in comparison to convex portion 76 so that wrinkles are not formed at concave portion 75.

Referring back to FIG. 1, it can be seen that the end portions of tube 70 are optionally provided with an indent 80, providing a further restriction to metal material flow at positions towards the end of the tube which are also longitudinally aligned with the concave inner portion 75 of the tube 70. The indents 80 are provided sufficiently close to the ends 28 so as to constitute a portion of the ends of the tube which are cut off after a hydroforming operation. These cut-off end portions are not expanded to any significant extent and remain with a substantially circular cross-section even after the hydroforming operation.

Figure 5:
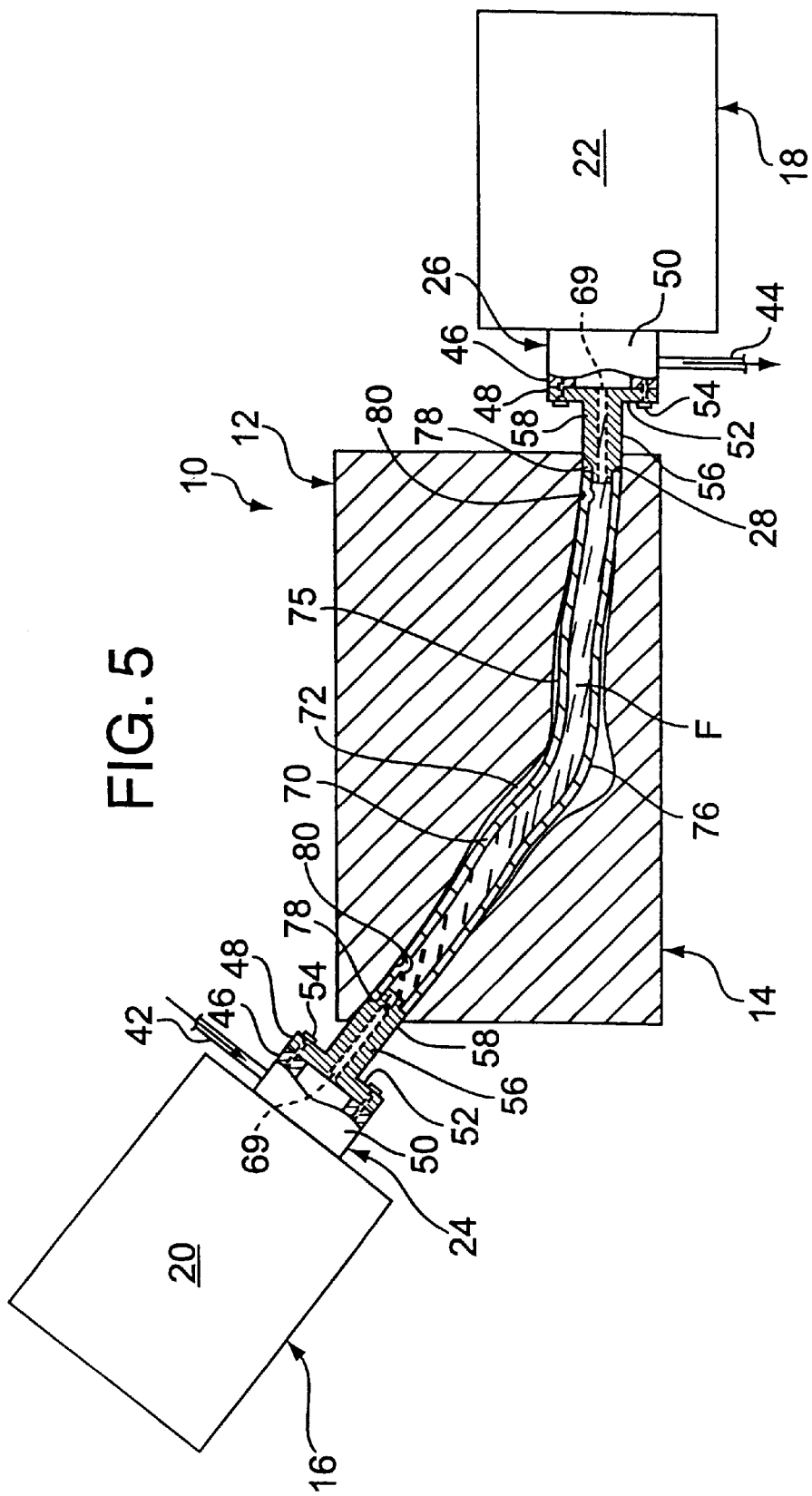
FIG. 5 is a view similar to that in FIG. 3, but showing the bent tube being filled with water in preparation for the next hydroforming step.

As shown in FIG. 5, the hydroforming process is commenced by placing tube 70 in the lower die structure 14, and then sealing the ends of the tube 70 with outer ram assemblies 24 and 26. The tube 70 is then filled with hydraulic fluid. Particularly, water and oil based additives are directed through part 42, into the outer ram 24, where it is then directed through the bore 69 into tube 70. The fluid is subsequently communicated through bore 69, in the opposite outer ram 26, where it is then directed to a lower tank, by means of part 44. During this process, the tube 70 is vented and purged of substantially all air bubbles and completely filled interiorly with hydraulic fluid, as indicated by reference letter F. After the tube is filled with fluid, the upper die portion is lowered onto lower die portion 14 to form the closed die cavity 72.

Figure 6:
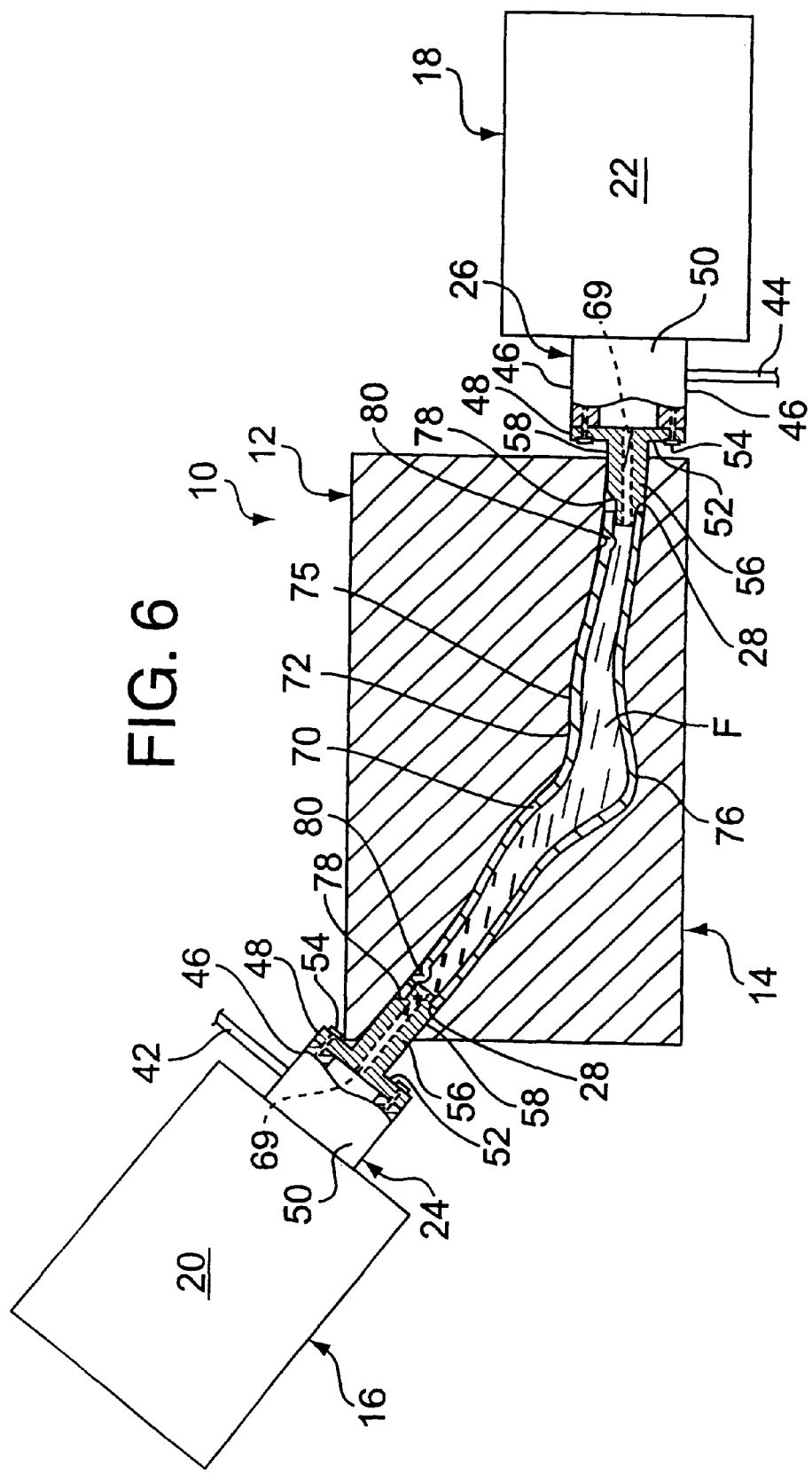
FIG. 6 is a view similar to FIG. 5, but showing the next step in the hydroforming process in which pressurized water expands the tube into its final shape in accordance with the present invention.

As can be seen in FIG. 6, the hydraulic fluid F is pressurized with intensifiers within the hydraulic ram assemblies 16 and 18 to begin tube expansion. Concurrently with radial expansion of the tube 70, outer rams 24 and 26 are forced inwardly toward one another against the opposite ends 28 of tube 70. As the annular flange surfaces 66 force the tube ends 28 inwardly, the metal material forming the tube 70 flows longitudinally along the length of the tube, so that the diameter of the tube can expand the tube in the bent areas by 10% or greater, while the wall thickness of the hydroformed tube 70 is maintained preferably within plus or minus 10% of the wall thickness of the original tube blank.

It can be appreciated that because the notched portions 78 of annular flange surfaces 66 do not forcibly contact the tube ends, substantially less metal is flowed along the portion of the tube longitudinally aligned with the concave inner portion 75. While some contact between the notched portions 78 and tube ends 28 is possible as a result of material flow and/or tube deformation, and would actually enhance the seal of the associated ram with the tube end, such contact would occur with much less force and at a later time than that which occurs at annular surface portion 67. Additionally, the indented portions 80 of the tube blank are also longitudinally aligned with the concave portion 75 of the tube and provide an area at which metal that attempts to flow longitudinally toward the concave portion 75 of the bent tube 70 is restricted, so as to reduce flow of metal towards concave portion 75. As a result, wrinkles are not formed at the concave portion 75.

Preferably, in accordance with the invention, the tube engaging annular surface portion 67 of the flange surface 66 comprises between 80°–160° (or about 22%–44%) of a complete circle. The extent of engagement with the ends of the tube 28 is a function of the angle α, the radius at concave portion 75, and the diameter of the tube 70. The greater the angle α and tighter the radius of the bend, the lesser the extent of tube engaging annular surface portion 67 is provided. In addition, for greater diameter tubes, the greater the extent of engagement is required and thus a larger engaging annular surface portion 67 is provided.

Most preferably, fluid pressure between 2,000 and 3,500 atmospheres is used to expand the tube. Depending upon the application, it may also be preferable to utilize pressures between 2,000 and 10,000 atmospheres, although even higher pressures can be used.

After tube 70 is formed into the desired wrinkle-free shape, generally corresponding to the shape of die cavity 72, hydraulic pressure is released, the outer rams 26 and 28 are driven outwardly from the tube ends 28, and the upper die structure is raised.

The notched portion 78 is shown on both annular flange surfaces 66 of the outer rams 24 and 26. It is contemplated by the present invention, however, that the notched portion 78 could be provided on only one of the outer rams. This is particularly the case where only one end of the tube 70 is to be pushed inwardly. In that event, the notched portion 78 is likely to be provided only on the one ram being pushed, and not the opposite stationary ram. Pushing one end of the tube is a desirable approach to hydroforming where one end portion of the tube is to be expanded to a significantly greater extent than the opposite end portion. The end portion to be expanded is the one to be pushed.

It is also contemplated that indents 80 could be omitted, or that only a single indent 80 can be provided. Normally, indent 80 would be used only in conjunction with an adjacent notched ram which is to be pushed inwards.

Shown in FIGS. 7, 8 and 9, is a second embodiment of the present invention. In this embodiment, the tube ends 128 are cut back or notched as shown at 182. The cut portions 182 are longitudinally aligned with the concave portion 175 of tube 170. Also, in this embodiment, the annular flange surfaces 166 of the rams are not provided with a notched portion. Rather, a complete, annular flange surface 166 is provided. The annular flange surfaces 166 of outer rams 124 and 126 in this embodiment push longitudinally inward against the end portions 128 of the tube 170. Since the annular flange surfaces 166 do not engage or push inwardly against the tube at cutoff portions 182, substantially less metal is flowed along the portion of the tube longitudinally aligned with the concave inner portion 175. It can be appreciated that with this second embodiment of the present invention, indents 180 may also be included to restrict metal flow within the tube and aid in the wrinkle-free hydroforming process. As shown, the indents 180 are spaced only slightly inward from tube ends 128, at a position which is eventually cutoff from the resulting hydroformed product.

Similarly to the first embodiment, a cut portion 182 could be provided at only one end of the tube 170 to be pushed inwardly.

While the invention has been disclosed and described herein with reference to the preferred embodiment, it will be apparent that variations and modifications may be made therein without departure from the spirit and scope of the invention. Therefore, the following claims are intended to cover all such modifications, variations, and equivalents in accordance with the principles and advantages noted herein.

What is claimed is:

1. A hydroformed vehicle part suitable to form a part of a rigid vehicle assembly, such as a vehicle frame assembly or the like;

said vehicle part being formed from a cylindrical blank having a predetermined wall thickness and a predetermined peripheral dimension;

said cylindrical blank being bent and hydroformed to provide a tubular structure having a central bend therein of at least approximately 30° and opposite angularly related end portions;

said central bend having a peripheral dimension in excess of approximately 10% of the predetermined peripheral dimension of the cylindrical blank;

said central bend including a concave portion free of wrinkles and a convex portion having a wall thickness within plus or minus 10% of the predetermined wall thickness of the cylindrical blank.

2. A hydroformed vehicle part according to claim 1, wherein said central bend has a diameter greater than a diameter of said end portions.

3. A hydroformed vehicle part according to claim 2, wherein said vehicle part has a generally rectangular cross-section.

4. A hydroformed vehicle part according to claim 2, wherein said convex portion of said vehicle part has a greater amount of flowed material therein in comparison with said concave portion.

5. A hydroformed vehicle part according to claim 1, further comprising at least one indentation on a portion of said tubular structure that is longitudinally aligned with the concave portion of said bend.

6. A hydroformed vehicle part according to claim 1, wherein at least one of said end portions is cut away at an angle at a portion of said tubular structure that is longitudinally aligned with the concave portion.

7. A hydroformed vehicle part according to claim 1, wherein said convex portion has a greater amount of flowed material therein in comparison with said concave portion.

* * * * *